United States Patent
Goldsmith et al.

(10) Patent No.: US 9,721,312 B2
(45) Date of Patent: *Aug. 1, 2017

(54) CUSTOMIZED ELECTRIC POWER STORAGE DEVICE FOR INCLUSION IN A MICROGRID

(76) Inventors: Steven Y. Goldsmith, Rochester, MN (US); David G. Wilson, Tijeras, NM (US); Rush D. Robinett, III, Tijeras, NM (US)

( * ) Notice: Subject to any disclaimer, the term of this patent is extended or adjusted under 35 U.S.C. 154(b) by 437 days.

This patent is subject to a terminal disclaimer.

(21) Appl. No.: 13/546,342

(22) Filed: Jul. 11, 2012

(65) Prior Publication Data

US 2012/0283887 A1 Nov. 8, 2012

Related U.S. Application Data

(63) Continuation-in-part of application No. 13/481,418, filed on May 25, 2012, which is a continuation-in-part of application No. 13/159,303, filed on Jun. 13, 2011, which is a continuation-in-part of application No. 12/633,045, filed on Dec. 8, 2009, now Pat. No. 8,527,247, which is a continuation-in-part of application No. 12/474,349, filed on May 29, 2009, now abandoned, which is a continuation-in-part of application No. 12/052,180, filed on Mar. 20, 2008, now Pat. No. 8,121,708, application No. 13/546,342, (Continued)

(51) Int. Cl.
| | | |
|---|---|---|
| G05D 5/00 | (2006.01) | |
| G05D 9/00 | (2006.01) | |
| G05D 3/12 | (2006.01) | |
| G05D 11/00 | (2006.01) | |
| G06Q 50/06 | (2012.01) | |
| H02J 3/32 | (2006.01) | |
| H02J 3/00 | (2006.01) | |

(52) U.S. Cl.
CPC ............ *G06Q 50/06* (2013.01); *H02J 3/32* (2013.01); *H02J 2003/007* (2013.01)

(58) Field of Classification Search
CPC ....... G06Q 50/06; H02J 3/32; H02J 2003/007
USPC ......... 700/97, 275, 276, 286, 287, 291, 295; 307/31, 151; 360/20
See application file for complete search history.

(56) References Cited

U.S. PATENT DOCUMENTS

| | | |
|---|---|---|
| 7,983,799 B2 | 7/2011 | Bose et al. |
| 8,164,217 B1 | 4/2012 | Miller |
| | (Continued) | |

OTHER PUBLICATIONS

H. Belmili, et al., Optimisation de dimensionnement des installations photovoltaiques autonomes—Exemples d'applications, eclairage et pompage au fil du soleil, Revue des Energies Renouvelables CICME '08 Sousse (2008), pp. 27-39.

(Continued)

*Primary Examiner* — Ziaul Karim
(74) *Attorney, Agent, or Firm* — Daniel J. Jenkins

(57) ABSTRACT

An electric power storage device included in a microgrid is described herein. The electric power storage device has at least one of a charge rate, a discharge rate, or a power retention capacity that has been customized for the microgrid. The at least one of the charge rate, the discharge rate, or the power retention capacity of the electric power storage device is computed based at least in part upon specified power source parameters in the microgrid and specified load parameters in the microgrid.

16 Claims, 18 Drawing Sheets

Related U.S. Application Data which is a continuation-in-part of application No. 13/241,054, filed on Sep. 22, 2011.

(60) Provisional application No. 61/507,935, filed on Jul. 14, 2011, provisional application No. 60/896,043, filed on Mar. 21, 2007.

(56) References Cited

U.S. PATENT DOCUMENTS

| | | | |
|---|---|---|---|
| 2003/0011348 A1* | 1/2003 | Lof | H02J 3/381 322/37 |
| 2004/0124812 A1 | 7/2004 | Delmerico et al. | |
| 2007/0100506 A1* | 5/2007 | Teichmann | H02J 3/24 700/297 |
| 2008/0212343 A1* | 9/2008 | Lasseter | H02J 3/30 363/39 |
| 2011/0082597 A1 | 4/2011 | Meagher | |
| 2011/0082598 A1 | 4/2011 | Boretto et al. | |
| 2011/0106322 A1 | 5/2011 | Ou | |
| 2011/0231028 A1 | 9/2011 | Ozog | |
| 2012/0101639 A1 | 4/2012 | Carralero et al. | |
| 2012/0119586 A1 | 5/2012 | Carralero et al. | |

OTHER PUBLICATIONS

M. Datta, A Frequency-Control Approach by Photovoltaic Generator in a PV-Diesel Hybrid Power System, IEEE Transactions on Energy Conversion, vol. 26, No. 2, Jun. 2011.

P. Tulpule et al., Hybrid Large Scale System Model for a DC Microgrid, 2011 American Control Conference, 2011.

Z. Wang et al., Studies of Multi-type Composite Energy Storage for the Photovoltaic Generation System in a Micro-grid, Electric Utility Deregulation and Restructuring and Power Technologies (DRPT), 2011 4th International Conference.

Z. Zheng eg al., A Control Method for Grid-friendly Photovoltaic Systems with Hybrid Energy Storage Units, Electric Utility Deregulation and Restructuring and Power Technologies (DRPT), 2011 4th International Conference.

International Search Report mailed Mar. 21, 2014 for PCT/US2012/046771.

International Preliminary Report on Patentability mailed Apr. 10, 2014 for PCT/US2012/046771.

Tulpule, et al., "Hybrid Large Scale System for a DC Microgrid", American Control Conference, San Francisco, CA, 2011. pp. 3899-3904.

Guerrero, et al., "Hierarchical Control of Droop-Controlled AC and DC Microgrids—A General Approach Toward Standardization", IECON Proceedings, 2009. pp. 4341-4346.

Colson, et al., "Multi-agent Microgrid Power Management", 18th IFAC World Congress, Milano, Italy, Aug. 28-Sep. 2, 2011. pp. 3678-3683.

Xiao, et al., "Hierarchical MAS Based Control Strategy for Microgrid", Energys 2010, 2. Sep. 10, 2010. pp. 1622-1638.

Peng, et al., "Control and Protection of Power Electronics Interfaced Distributed Generation Systems in a Customer-Driven Microgrid", 2009 IEEE Power and Energy Society General Meeting, Jul. 26-30, 2009. pp. 1-8.

Robinett III, et al., "Enabling Secure, Scalable Microgrids with High Penetration Renewables: Grand Challenge Laboratory Directed Research and Development", Fact Sheet, Mar. 2011. pp. 1-2.

* cited by examiner

CUSTOMIZED ELECTRIC POWER STORAGE DEVICE FOR INCLUSION IN A MICROGRID

CROSS-REFERENCE TO RELATED APPLICATIONS

This application claims priority to U.S. Provisional Patent Application No. 61/507,935, filed on Jul. 14, 2011, and entitled "RENEWABLE ENERGY MICROGRID CONTROL VIA ENERGY STORAGE". This application is also a continuation-in-part of U.S. patent application Ser. No. 13/481,418, filed on May 25, 2012, which is a continuation-in-part of U.S. patent application Ser. No. 13/159,303, filed on Jun. 13, 2011, which is a continuation-in-part of U.S. patent application Ser. No. 12/633,045, now U.S. Pat. No. 8,527,247 filed on Dec. 8, 2009, which is a continuation-in-part of U.S. patent application Ser. No. 12/474,349, now abandoned filed on May 29, 2009, which is a continuation-in-part of U.S. patent application Ser. No. 12/052,180, now U.S. Pat. No. 8,121,708 filed on Mar. 20, 2008, which claims the benefit of U.S. Provisional Patent Application No. 60/896,043, filed on Mar. 21, 2007. This application is also a continuation-in-part of U.S. patent application Ser. No. 13/241,054, filed on Sep. 22, 2011. The entireties of each of these applications are incorporated herein by reference.

STATEMENT OF GOVERNMENTAL INTEREST

This invention was developed under Contract DE AC04-94AL85000 between Sandia Corporation and the U.S. Department of Energy. The U.S. Government has certain rights in this invention.

BACKGROUND

Relatively recently, there has been a push to rethink how electric power is provided to consumers. Conventionally, relatively large power plants burn fossil fuels to provide electric power to consumers. These power plants are typically controlled by private entities that bill consumers as a function of an amount of power utilized by the consumers over some time period. In the conventional power grid, suppliers provide a seemingly infinite amount of energy to consumers, such that consumers can vary their demands for electric power, and the supplier meets the varying demands. Thus, consumers can simply request power (by turning on and off devices, by running air-conditioning units, etc.), and the supplier ensures that the requested power is available to the consumer. Of growing concern with respect to these types of power systems is the waste of non-renewable resources consumed by the power plants when producing electric power, as well as pollution generated by such plants. For instance, generators utilized in conventional power plants are not configured to allow for scaled output—that is, such generators are configured to output a constant amount of electric power, regardless of whether such power is being utilized by consumers. Scaling operation of a generator downward based upon an amount of requested power will potentially result in damage to the generator.

In an attempt to reduce carbon emissions and other pollutants caused by these conventional power systems, distributed power systems that employ renewable energy to generate electric power have been manufactured and deployed. These types of power systems include, but are not limited to, wind turbine farms, hydro-turbines, solar panel fields, geothermal power systems, and the like. While these systems offer a promising alternative to the conventional power grid, there are various deficiencies associated therewith. First, such types of systems generally output variable amounts of power over time (depending upon sunlight, cloud cover, wind, and the like), rendering it difficult to meet changing demands of consumers. Additionally, these types of systems tend to be less efficient than the conventional power systems that burn fossil fuels, and the cost of building such systems on a wide scale tends to be relatively high. Further, such systems remain centralized in that if a natural disaster or other unexpected event causes one of such systems to be disabled, numerous consumers that are provided with power generated by such systems would be negatively impacted.

To overcome at least some of the deficiencies set forth above, microgrids have been theorized, wherein a microgrid comprises at least one independently owned electric power source that is configured to provide electric power to at least one consumer in an area that is local to the source of the electric power. Pursuant to an example, a homeowner can attach photovoltaic cells to the rooftop of her home. Additionally, the homeowner may have a storage device (a capacitor bank, a series of batteries, etc.) that is configured to capture electric power generated by the photovoltaic cells that is not consumed by the homeowner at the time that the electric power is generated, thereby allowing electric power retained in the storage device to be later retrieved when desired. Currently, designing a microgrid is an inexact science, often with a designer of the microgrid having to guess as to the equipment that will be needed to provide a suitable amount of power to a home, a building, a base, or other region served by the power source of the microgrid.

SUMMARY

The following is a brief summary of subject matter that is described in greater detail herein. This summary is not intended to be limiting as to the scope of the claims.

Described herein are various technologies pertaining to the design and control of a microgrid. With more particularity, an electric power storage device with parameters that are customized based upon parameters of sources and loads in a microgrid is described herein. Additionally, various technologies pertaining to computing data that is indicative of parameters of an electric power storage device to include in a microgrid are described herein, wherein the parameters of the electric power storage device ensure that specified performance constraints are met and that the collective microgrid remains stable. Moreover, the employment of real-time predictive model-based control is described herein to facilitate ensuring that power demands of the microgrid are met and that the microgrid remains stable.

In an exemplary embodiment, a tool described herein includes functionality that allows a designer of a microgrid to specify parameters of a power source and load of a microgrid. With more specificity, a computer-implemented model of a microgrid can be accessed by a designer, and the designer can specify values/functions for parameters of entities in the microgrid. As will be understood by one skilled in the art, a microgrid can include an electric power source that outputs electric power and a variable load that consumes power. In an exemplary embodiment, the electric power source can be a variable power source, such as a wind turbine, a photovoltaic (PV) power system, a hydro-turbine (hydro-pump), a geothermal power system, or some other suitable power system that employs renewable resources to generate varying amounts of power depending upon one or more environmental conditions. Using the tool, the designer of a microgrid can specify the type of electric power source and parameters of the electric power source. Additionally, the designer of the collective microgrid can specify parameters of a load in the microgrid. In addition, the designer may optionally specify any cost constraints for one or more electric power storage devices that are to be included in the microgrid.

Responsive to the designer setting forth the aforementioned parameters and indicating that a customized profile for an electric power storage device is desirably generated, the customized profile for the electric power storage device is computed based at least in part upon the parameters. Subsequently, the designer can select an electric power storage device to include in the microgrid that conforms to the customized profile. Additionally, the electric power storage device meets any other performance constraints set forth by the designer and ensures that the microgrid remains stable. In a non-limiting example, a particular homeowner may wish to create her own microgrid. As such, the homeowner may have photovoltaic cells attached to the roof of her home and may wish that the home be detached (or at least detachable) from the conventional grid. To ensure that the demands of the homeowner for power are consistently met (even at night), the homeowner may recognize that an electric power storage device may be necessary to capture excess electric power generated by the photovoltaic power system during the day, such that the electric power storage device can discharge at least some electric power at night to meet the power demands of the homeowner. The homeowner can employ the tool to identify an electric power storage device that supplements the photovoltaic power system when the demands of the load exceed electric power produced by the photovoltaic power system, and supplements the load when electric power generated by the photovoltaic power system exceeds the demands of the load (e.g., by capturing excess power).

In an exemplary embodiment, a computer-implemented model of a microgrid is described, wherein the model comprises two boost converters fed by voltage sources that are connected to a DC bus to power an equivalent load. Using this model, the tool can output a customized profile for an electric power storage device to be included in the microgrid. Electric power storage devices that may map to the profile output by the tool include a collection of batteries, a capacitor bank, a flywheel, or the like. Additionally, the tool may output data that indicates that another power source (such as a constant power source) is needed to meet the performance demands and to ensure stability of the microgrid. An exemplary power source may be, for example, a fossil fuel-powered electric generator.

In another exemplary embodiment, a DC bus microgrid can be modeled to facilitate real-time predictive control in a microgrid. In such an embodiment, a computer-implemented model of a DC bus microgrid can be leveraged to design control algorithms for inclusion in grid hardware. When the microgrid is deployed, a distributed computing and communications architecture facilitates computing control signals for employment by boost converters in the microgrid, wherein the boost converters are coupled to power sources in the microgrid.

Other aspects will be appreciated upon reading and understanding the attached figures and description.

DETAILED DESCRIPTION

Figure 1:
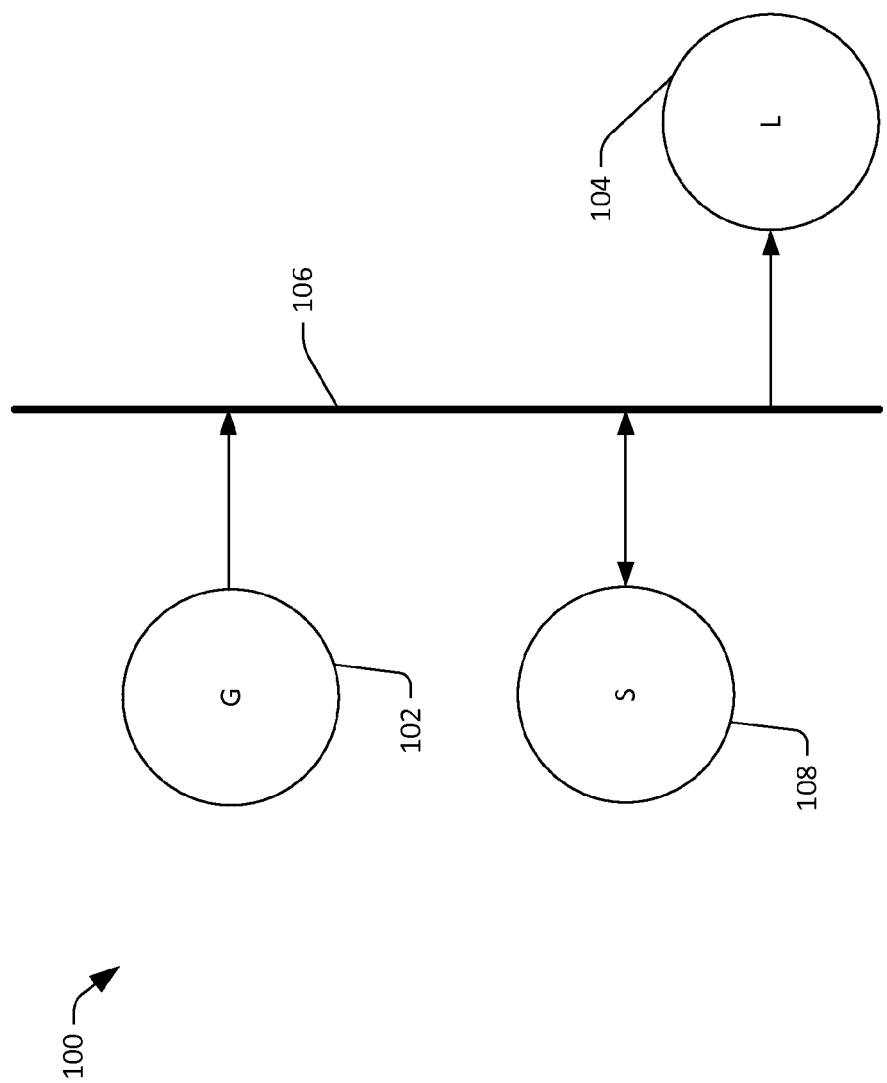
FIG. 1 is a diagram of an exemplary microgrid.

Various technologies pertaining to designing a microgrid will now be described with reference to the drawings, where like reference numerals represent like elements throughout. In addition, functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware-only configurations that perform certain functionality, including field programmable gate arrays (FPGAs) or other suitable hardware.

With reference now to FIG. 1, an exemplary microgrid 100 is illustrated. The microgrid 100 comprises a source of electric power 102 that generates electric power. Pursuant to an example, the source of electric power 102 can be a variable source of electric power, such as a photovoltaic power system, a wind turbine, a geothermal power system, a solar power tower, a hydro pump, or the like. In another exemplary embodiment, the source of electric power 102 may be a fossil fuel burning source of electric power, such as a generator.

The microgrid 100 further comprises a variable load 104, which consumes electric power generated by the source of electric power 102. The variable load 104, for example, can represent the collective demands for electric power of a region included in the microgrid 100. In an example, the variable load 104 can represent electric power demands of a house or neighborhood. In another example, the variable load 104 can represent demands for electric power of a military base, a cell phone tower, or the like, where demands for electric power vary over time.

The microgrid 100 comprises a direct current (DC) bus 106, wherein the variable load 104 is electrically connected to the DC bus 106 and extracts electric power therefrom. In an exemplary embodiment, the source of electric power 102 is electrically connected to the DC bus 106 such that the source of electric power 102 charges the DC bus 106. The variable load 104 then draws power from the DC bus 106, which is charged by the source of electric power 102.

One skilled in the art will ascertain that if the source of electric power 102 is a variable source of electric power, such variable source of electric power may not be able to meet changing demands of the variable load 104. For example, if the source of electric power 102 is a photovoltaic power generation system, then such photovoltaic power generation system may not meet the demands for electric power of the variable load 104 at night. In another example, if the source of electric power 102 is a fossil fuel-burning source of electric power, such source is not configured to vary an amount of electric power output thereby over time. Accordingly, in such an example, the source of electric power 102 outputs a steady amount of electric power, which is known to meet the changing demands of the variable load 104. This, however, can result in the waste of relatively valuable resources, as oftentimes more fossil fuel is burned than necessary to meet the demands of the variable load 104.

Accordingly, the microgrid 100 can include an electric power storage device 108 that can supplement both the source of electric power 102 and the variable load 104, depending upon an amount of electric power generated by the source of electric power 102 and the demands for electric power of the variable load 104. For example, when an amount of electric power generated by the source of electric power 102 exceeds the demands for electric power of the variable load 104, the electric power storage device 108 can supplement the variable load 104 by consuming excess electric power (and storing such electric power). When the amount of electric power demanded by the variable load 104 exceeds an amount of electric power generated by the source of electric power 102, the electric power storage device 108 can supplement the source of electric power 102 by discharging electric power for consumption by the variable load 104.

In an exemplary embodiment, the electric power storage device 108 can be electrically connected to the DC bus 106, such that the electric power storage device 108 consumes excess power generated by the source of electric power 102 and discharges electric power when demanded by the variable load 104. In another exemplary embodiment, the electric power storage device 108 can be directly connected to the source of electric power 102 (which charges the electric power storage device 108), and the electric power storage device 108 can in turn meet demands for electric power of the variable load 104. In such an embodiment, the source of electric power 102 may not be electrically connected to the DC bus 106.

The electric power storage device 108 can be any suitable device (or collection of devices) that can both consume and discharge electric power. Accordingly, the electric power storage device 108 can be a battery, a collection of batteries, a capacitor, a capacitor bank, a flywheel, or the like. In still other embodiments, the electric power storage device 108 can be a fossil fuel burning device that is employed to supplement the source of electric power 102 when such source of electric power 102 is a variable source of electric power.

It can be recognized that it is desirable to design the microgrid 100 such that an amount of electric power generated by the source of electric power 102 is equivalent to the demand of electric power from the variable load 104. Described herein is a tool that assists a designer of a microgrid in connection with ascertaining parameters of the electric power storage device 108 that is to be included in the microgrid 100, wherein the electric power storage device 108 allows a specification set forth by the designer of the microgrid 100 to be met (while maintaining stability of the microgrid 100). In an example, the tool described herein allows the designer of the microgrid 100 to specify parameters of the source of electric power 102 and parameters of the variable load 104, and outputs a customized profile for the electric power storage device 108 such that the designer of the microgrid 100 can identify an appropriate electric power storage device that meets the customized profile. Such storage device ensures that the specification set forth by the designer is met while the microgrid 100 remains stable.

The microgrid 100 is defined as a standalone electric power system that is either entirely disconnected from the conventional power grid or entirely disconnectable from the conventional power grid. Thus, the microgrid 100 is designed to potentially act in a self-sufficient manner (e.g., the microgrid 100 need not be connected to another grid, although the microgrid 100 may desirably be coupled to another microgrid or collection of microgrids). In an example, the microgrid 100 can pertain to an individual home, wherein the source of electric power 102 is purchased by a homeowner and the variable load 104 represents the electric power demands of the homeowner. In another exemplary embodiment, a microgrid 100 can represent a collection of homes or even a town. It is to be emphasized again, however, that the microgrid 100 is either entirely disconnected from or disconnectable from the conventional electric power grid.

Figure 2:
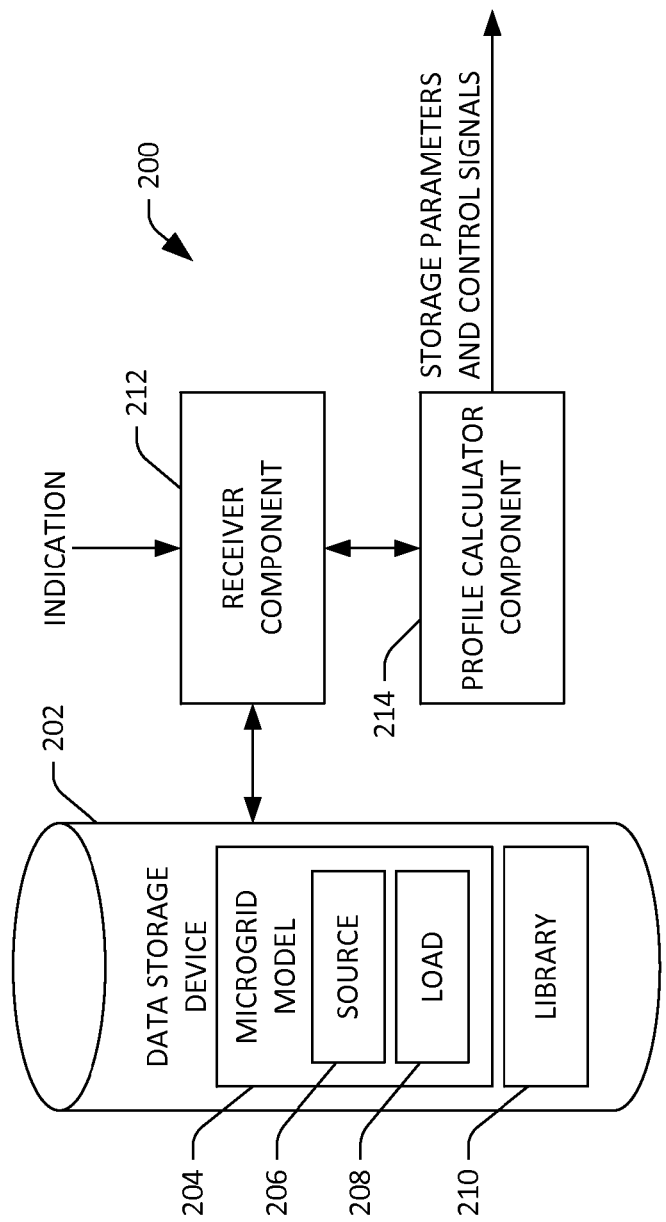
FIG. 2 is a functional block diagram of an exemplary system that facilitates outputting data that is indicative of at least one parameter of at least one electric power storage device that is to be included in a microgrid.

Now referring to FIG. 2, an exemplary system 200 that facilitates generating a customized profile for an electric power storage device that is to be included in a proposed microgrid is illustrated. The system 200 comprises a computer-readable data storage device 202, which can be a hard drive, a memory, a removable storage device such as a compact disc, DVD, flash drive, etc., or other suitable computer-readable data storage device. The data storage device 202 comprises a microgrid model 204, wherein the microgrid model 204 is a model of a proposed or existing microgrid. The microgrid model 204 includes a representation of a source of electric power 206 and a representation of a variable load 208 (hereafter referred to as the source of electric power 206 and the variable load 208). For instance, the source of electric power 206 and the variable load 208 in the data storage device 202 can represent the source of electric power 102 and the variable load 104 of the microgrid 100. As indicated above, the source of electric power 206 can be a variable source of electric power. Both the source of electric power 206 and the variable load 208 in the proposed microgrid can be represented through utilization of a function, through definition of a plurality of parameters, etc.

In an exemplary embodiment, the data storage device 202 may comprise a library 210 of selectable entities that can be included in the proposed microgrid. This allows a designer of a microgrid to select types of power sources and types of variable loads. For instance, the library 210 can comprise a representation of a photovoltaic power generation system, a wind turbine, etc., and the designer of the microgrid can select such entity from the library 210. The designer of the microgrid may then further customize the selected entity for inclusion in the proposed microgrid. If the designer of the microgrid already has access to a particular electric power storage device, then the microgrid model 204 can additionally comprise a representation of such electric power storage device. Again, different types of electric power storage devices can be represented in the library 210.

The system 200 further comprises a receiver component 212 that receives an indication that a customized profile for an electric power storage device that is to be included in the proposed microgrid is desirably generated. Accordingly, the designer of the microgrid can set forth a configuration of the proposed microgrid, and can thereafter request a customized power profile to be generated for an electric power storage device that is to be included in the proposed microgrid, wherein such customized profile conforms to the specifications set forth by the designer of the microgrid (the parameters of the source of electric power 206, the parameters of the variable load 208, and other parameters set forth by the designer of the proposed microgrid). The customized power profile also conforms to one or more stability constraints, such that the microgrid remains stable under potential variations set forth in the specification.

A profile calculator component 214 is in communication with the receiver component 212, wherein the profile calculator component 214, responsive to the receiver component 212 receiving the indication, generates the customized profile for the electric power storage device to be included in the proposed microgrid. As will be described in greater detail below, the profile calculator component 214 generates the customized profile for the electric power storage device based at least in part upon the source of electric power 206 and the variable load 208 represented in the microgrid model 204. In other words, the profile calculator component 214 generates the customized profile for the electric power storage device based at least in part upon parameters that are descriptive of the source of electric power 206 that is to be included in the proposed microgrid and parameters that are descriptive of the variable load 208 that is to consume electric power in the proposed microgrid.

Additionally, the profile calculator component 214 can execute simulations such that control signals are output for employment in power electronics that are coupled to the electric power storage device, the source of electric power 206, and/or the variable load 208. For example, power electronics can be configured to selectively connect and disconnect the electric power storage device from the DC bus and can otherwise be configured to control flow of electric power to, and from, the electric power storage device. Thus, the profile calculator component 214 can output data that is indicative of control signals that are to be received and executed by the power electronics to ensure that the proposed microgrid remains stable.

Figure 3:
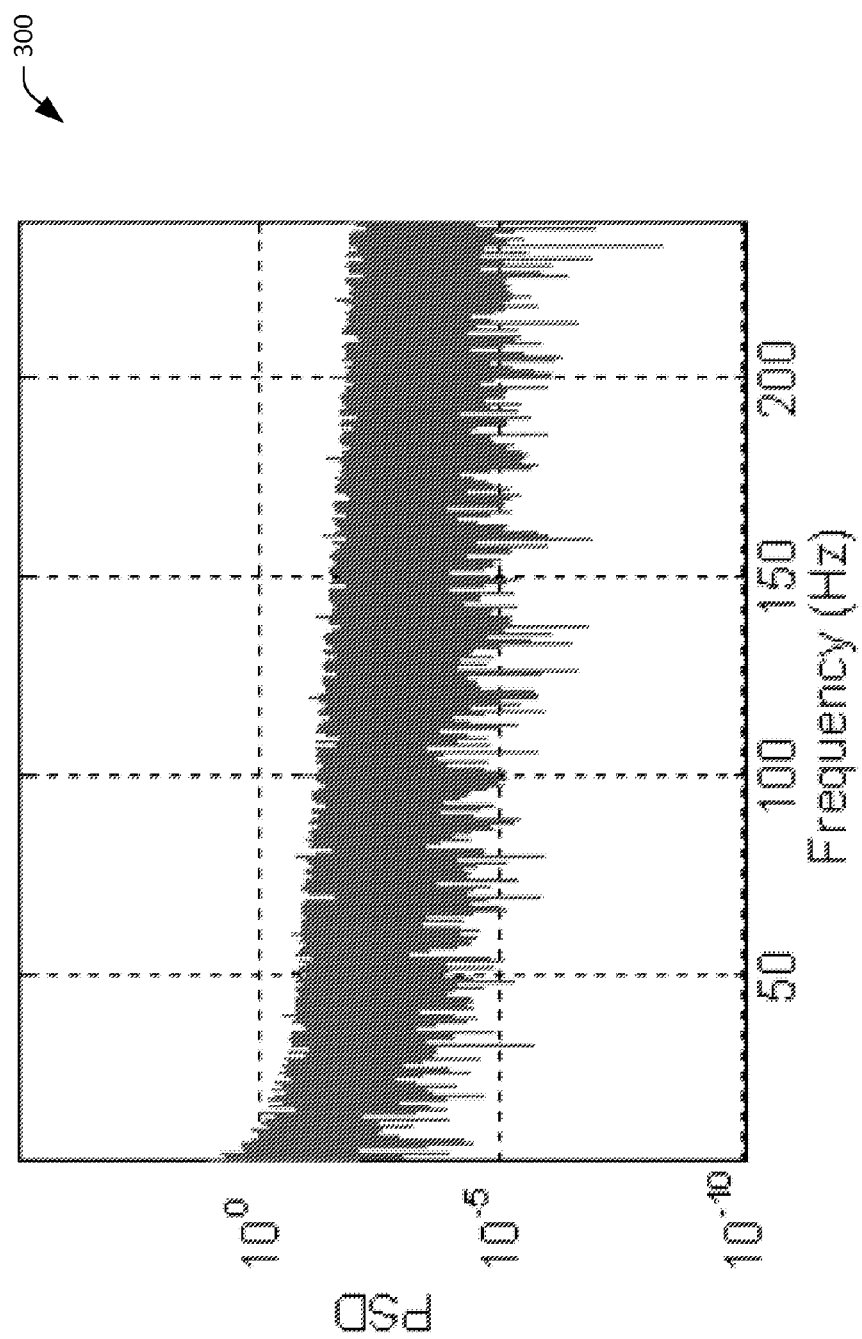
FIG. 3 is an exemplary graph illustrating frequency response parameters of an electric power storage device.
Figure 4:
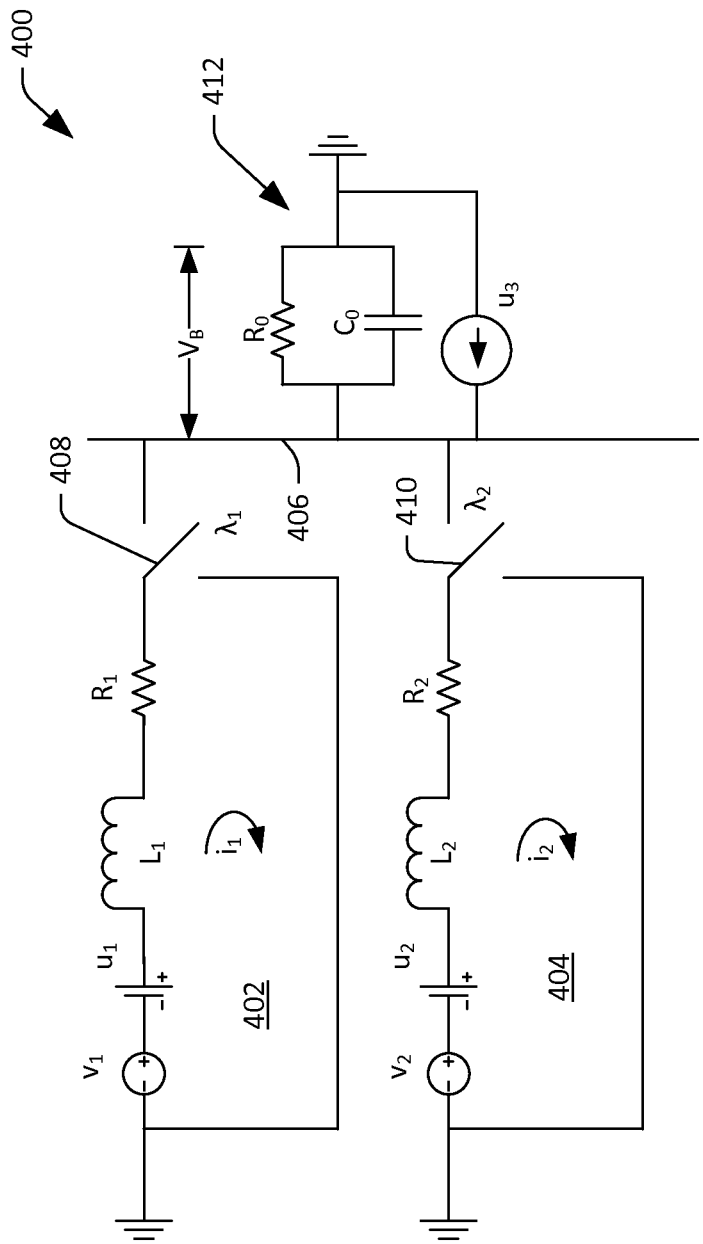
FIG. 4 is an exemplary model of a collective microgrid.

With reference briefly to FIG. 3, an exemplary graph 300 that is indicative of the customized profile for the electric power storage device for the proposed microgrid output by the profile calculator component 214 is illustrated. Specifically, the graph 300 illustrates exemplary frequency response requirements for an electric power storage device that is to be included in a proposed microgrid for a certain set of parameters that are descriptive of the source of electric power 206 and the variable load 208. Other data (not shown) that can be generated by the profile calculator component 214 that is indicative of requirements of the electric power storage device can include power requirements, energy requirements, charge and discharge rate, etc. A designer of the proposed microgrid can review the graph 300, as well as other data output by the profile calculator component 214, and can identify an electric power storage device that conforms to such profile Turning now to FIG. 4, a schematic diagram of an exemplary model 400 of a microgrid is illustrated. It is to be understood that the model 400 is but one exemplary manner that can be employed to represent a microgrid, but that other models are contemplated by the inventors and are intended to fall under the scope of the hereto-appended claims. The model 400 includes a first boost converter 402 and a second boost converter 404. The first boost converter 402 and the second boost converter 404 are fed by voltage sources $V_1$ and $V_2$, respectively.

The model 400 further comprises a DC bus 406, wherein the first boost converter 402 and the second boost converter 404 are connected to the DC bus 406 by way of switches 408 and 410, respectively.

The model 400 further comprises a load 412, which is powered by the first boost converter 402 and the second boost converter 404. In the model 400, the load 412 is an equivalent load. The circuit equations for the first boost converter 402, the second boost converter 404, and the DC bus 406 are respectively as follows:

$$L_1 \frac{di_1}{dt} = -R_1 i_1 - \lambda_1 v_B + v_1 + u_1 \quad (1)$$

$$L_2 \frac{di_2}{dt} = -R_2 i_2 - \lambda_2 v_B + v_2 + u_2$$

$$C_o \frac{dv_B}{dt} = \lambda_1 i_1 + \lambda_2 i_2 - \frac{1}{R_o} v_B + u_3.$$

The circuit equations can be written as state equations as follows:

$$L_1 \dot{x}_1 = -R_1 \dot{x}_1 - \lambda_1 x_3 + v_1 + u_1$$

$$L_2 \dot{x}_2 = -R_2 x_2 - \lambda_2 x_3 + v_2 + u_2$$

$$C_o \dot{x}_3 = \lambda_1 i_1 + \lambda_2 x_2 - 1/R_o x_3 + u_3. \quad (2)$$

Similarly, the circuit equations can be written in matrix equation form as follows:

$$\begin{bmatrix} L_1 & 0 & 0 \\ 0 & L_2 & 0 \\ 0 & 0 & C_o \end{bmatrix} \begin{Bmatrix} \dot{x}_1 \\ \dot{x}_2 \\ \dot{x}_3 \end{Bmatrix} = \begin{bmatrix} -R_1 & 0 & -\lambda_1 \\ 0 & -R_2 & -\lambda_2 \\ \lambda_1 & \lambda_2 & -\frac{1}{R_o} \end{bmatrix} \begin{Bmatrix} x_1 \\ x_2 \\ x_3 \end{Bmatrix} + \begin{Bmatrix} v_1 \\ v_2 \\ 0 \end{Bmatrix} + \begin{Bmatrix} u_1 \\ u_2 \\ x_3 \end{Bmatrix} \quad (3)$$

or $$M\dot{x} = Rx + v + u = [\overline{R} + \tilde{R}]x + v + u, \quad (4)$$

where $\lambda_1, \lambda_2$ = boost converter duty cycles;
$i_1, i_2$ = boost converter currents;
$R_1, R_2$ = boost converter resistances;
$L_1, L_2$ = boost converter inductances;
$v_1, v_2$ = renewable and/or fossil source voltages;
$V_B$ = DC bus voltage;
$R_0$ = DC bus equivalent resistance;
$C_0$ = DC bus equivalent capacitance;
$u_1, u_2$ = energy storage voltage sources;
$u_3$ = energy storage current source.

It can be noted that the R matrix is written as a diagonal matrix, $\overline{R}$ and a skew symmetric matrix $\tilde{R}$.

Duty cycle commands for the boost converters 402 and 404 are now discussed. The duty cycle commands can be obtained from the steady-state solution of Eq. (2) with u=0, or $$0 = -R_1 x_1 - \lambda_1 x_3 + v_1$$

$$0 = -R_2 x_2 - \lambda_2 x_3 + v_2$$

$$0 = -\lambda_1 x_1 + \lambda_2 x_2 - 1/R_o x_3 \quad (5)$$

which leads to the following quadratic equation in the duty cycles:

$$x_{1_o} = -\frac{1}{R_1}(\lambda_1 x_3 - v_1) \quad (6)$$

$$x_{2_o} = -\frac{1}{R_2}(\lambda_2 x_3 - v_2)$$

$$x_{3_o} = R_o(\lambda_1 x_1 + \lambda_2 x_2)$$

or $$R_o x_{3_o}\left(\frac{1}{R_1}\lambda_1^2 + \frac{1}{R_2}\lambda_2^2\right) - R_o\left(\frac{v_1}{R_1}\lambda_1 + \frac{v_2}{R_2}\lambda_2\right) + x_{3_o} = 0. \quad (7)$$

Eq. (7) can be employed to update the nominal duty cycles for the boost converters 402 and 404 to meet a desired DC bus voltage, $x_{3_o}$, as the renewable energy voltage supplies, $v_1$, $v_2$, vary over time.

With respect to boost converter servo loop control, typically the guidance control duty cycle commands, or λs, can provide the reference command to a servo loop control system, and the feedback would correct for disturbances and parameter mismatches. For purposes of discussion, the servo loop control can be considered ideal with respect to the model 400.

With respect to Hamiltonian Surface Shaping and Power Flow Control (HSSPFC) for energy storage, a first step in the design process can be to define an error state for Eq. (4) as follows:

$$\tilde{x} = x_{ref} - x, \quad (8)$$

where the reference state vector is defined as follows:

$$M\dot{x}_{ref} = [\bar{R} + \tilde{R}]x_{ref} + v + u_{ref}. \quad (9)$$

For this example, the reference vector is a constant and the reference control is given by the following:

$$u_{ref} = [\bar{R} + \tilde{R}]x_{ref} - v \quad (10)$$

Subsequently, the Hamiltonian can be defined as follows:

$$H = \frac{1}{2}\tilde{x}^T M \tilde{x}, \quad (11)$$

which is positive definite about $\tilde{x}=0$ and is the static stability condition. Thereafter, the time derivative (or power flow) can be determined as follows:

$$\dot{H} = \tilde{x}^T M \dot{\tilde{x}} = \tilde{x}^T [M\dot{x}_{ref} - M\dot{x}] \quad (12)$$

$$= \tilde{x}^T \left[(\bar{R}+\tilde{R})x_{ref} + v + u_{ref} - (\bar{R}+\tilde{R})x - v - u\right]$$

-continued $$= \tilde{x}^T(\bar{R}+\tilde{R})\tilde{x} + \tilde{x}^T[u_{ref} - u]$$

$$= \tilde{x}^T \bar{R} \tilde{x} + \tilde{x}^T \Delta u$$

It can be noted that $\tilde{x}^T \tilde{R} \tilde{x}=0$, since $\tilde{R}$ is skew symmetric. Subsequently, a proportional integral (PI) controller can be selected as follows:

$$\Delta u = -K_p \tilde{x} - K_I \int_0^t \tilde{x} dt \quad (13)$$

which leads to the following:

$$u = u_{ref} - \Delta u, \quad (14)$$

and $$\dot{H} = \tilde{x}^T[\bar{R} - K_p]\tilde{x} - \tilde{x}^T K_I \int_0^t \tilde{x} dt < 0, \quad (15)$$

such that $$\tilde{x}^T[K_p - \bar{R}]\tilde{x} > -\tilde{x}^T K_I \int_0^t \tilde{x} dt, \quad (16)$$

which is also known as the dynamic stability condition. From the above, it can be ascertained that the customized profile for the electric power storage device can conform to at least one of the stability conditions (the static stability condition and/or the dynamic stability condition).

For purposes of explanation, observations pertaining to Eq. (10) and Eq. (14) are set forth. First, it can be noted that Eq. (10) is an equivalent guidance command that is fully coupled in the states and dependent upon the duty cycle commands. The duty cycle commands can be determined from an optimization routine (e.g. sequential quadratic programming, dynamic programming, etc.) when desired cost functions and constraints are included.

For renewable energy sources, v will be time varying and possibly stochastic, which can lead to an under actuated system for 0% energy storage, u=0.

For fossil energy sources, v will be dispatchable with excess capacity, which can lead to an over-actuated system with 100% energy storage, even with u=0.

For u≠0, the microgrid with 100% transient renewable energy sources (photovoltaic power systems and wind-based power systems) leads to the requirements for energy storage devices. The energy storage devices are modeled as voltage sources and current sources, respectively, in the model 400. Furthermore, the controller, u, is decoupled which simplifies the design procedure.

Figure 5:
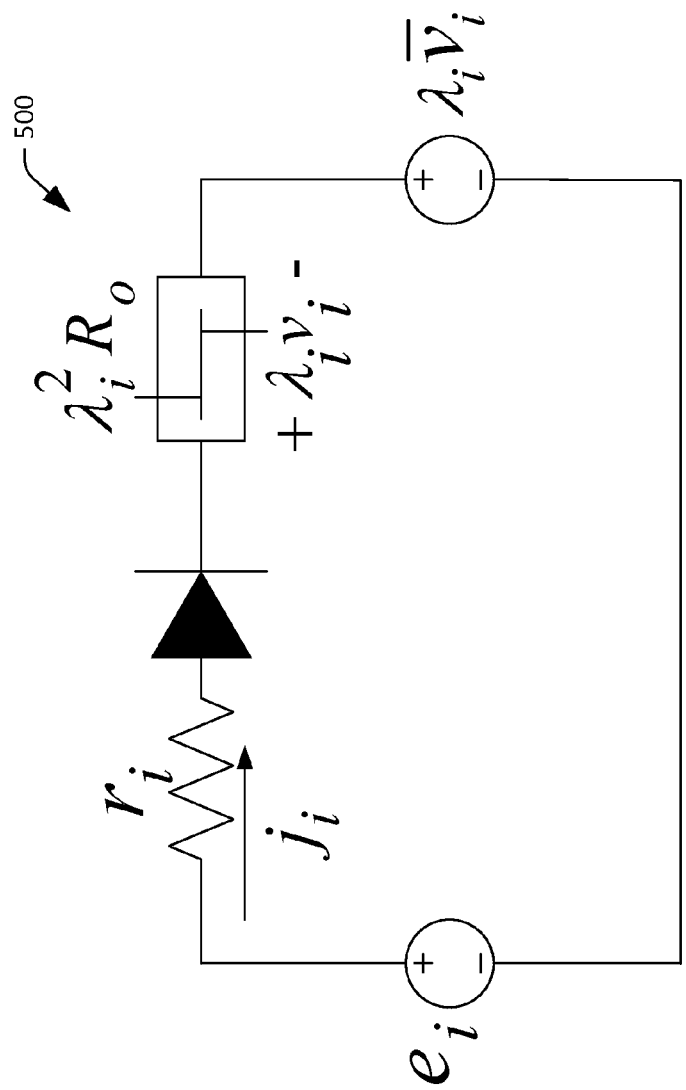
FIG. 5 is an exemplary model of a boost converter that can be employed in connection with model-based predictive control of a microgrid.

Turning now to FIG. 5, an exemplary schematic model 500 of a boost converter that is employed to provide power to a DC bus is illustrated. The boost converter is shown as including a power source which can represent any of the power sources described herein. Further, the model 500 is shown as being a single, closed-loop circuit. It is to be understood that numerous models can be simultaneously analyzed to ascertain duty cycle signals for boost converters that power a DC bus. In the exemplary model 500, a storage system need not be specified; rather, the model 500 can be analyzed to identify duty cycles that harmonize the microgrid, thereby ensuring that an amount of voltage on the DC bus is within predefined thresholds of a known reference voltage amount (e.g., 120 volts). Therefore, the model 500 can be employed in connection with predictive model-based control, wherein multiple voltage sources are coupled to the DC bus to provide electric power for various loads that consume varying amounts of power. The distributed nature of such a microgrid allows for storage devices to be omitted, as sufficient electric power can be provided by a collection of voltage sources coupled to the DC bus. It is to be understood, however, that the model 500 can be configured to include electric power storage devices. Additionally, control signals can be computed through utilization of the model 500, and can be employed in the system 200 described above when computing customized profiles of electric power storage devices.

The model. 500 is shown as being general in nature; it is to be understood that a microgrid can include numerous boost controllers that must operate in conjunction (and communicate with one another) to ensure that the microgrid operates in a harmonious manner. To that end, power electronics included in the microgrid can communicate with one another by way of an agent-based communication and computation architecture, which is described in U.S. patent application Ser. No. 13/159,303, and filed on Jun. 13, 2011. Moreover, the structure of the microgrid itself can be as described in such application.

Collaboration between boost converters in a microgrid that includes multiple voltage sources and potentially varying loads is imperative, as each individually off-the-shelf boost converter has a controller, and if operating independently, the respective controllers will interfere with harmonious operation of the microgrid, potentially causing thrashing or other instability. The model 500 facilitates utilization of a model-based controller that operates based upon a direct model-based computation utilizing control signals corresponding to various boost converters. Accordingly, employment of the model 500, rather than closing the loop on each individual boost converter controller, facilitates determining control signals for employment by the boost converters that harmonizes the microgrid. Again, in operation, acquisition of data for entities included in the model 500 can be undertaken through the agent-based architecture. Moreover, computations can be distributed amongst power electronics through utilization of the agent-based control architecture.

While not shown, a controller is coupled to the boost converter to effectively control duty cycle of the boost converter. Control signals output by the controller are represented in the model 500 as $\lambda$. As will be shown below, values of $\lambda$ are dependent upon values of $\lambda$ provided to other boost converters in the microgrid. The schematic model 500 of the boost converter includes a representation of an internal resistance $r_i$, a total output resistance $R_O$ (to represent collective loads on the DC bus) and a dependent voltage source $\bar{v}_i$. If the model 500 is set such that the voltage produced by the power source is equivalent to the voltage consumed by the load, then the following equation describes operation of the boost converter:

$$e_i - r_i j_i - \lambda_i^2 R_O j_i - \lambda_i R_O \Sigma_{k=1, k \neq i}^{N} \lambda_k j_k = 0, \quad (17)$$

where $\lambda_k$ refers to control signals for the kth boost converter utilized to power the DC bus and $j_k$ is the current through the kth boost converter.

Eq. (17) can be rewritten as follows:

$$e_i - r_i j_i - \lambda_i v_i - \lambda_i \bar{v}_i = 0, \quad (18)$$

where $$v_i = \lambda_i R_O j_i, \quad (19)$$

$$\bar{v}_i = R_O \Sigma_{k=1, k \neq i}^{N} \lambda_k j_k, \quad (20)$$

and $$v_O = v_i + \bar{v}_i = R_O J_O. \quad (21)$$

It can be noted that if $\bar{v}_i > e_i$, then $j_i < 0$.

An exemplary formulation, where control signals for three boost converters are computed, is provided below. It is to be understood, however, that control signals for any suitable number of boost converters that are providing voltage to the DC bus of the microgrid can be ascertained through various optimization techniques. Equations representing parameters of the three boost converters are as follows:

$$e_1 - r_1 j_1 - \lambda_1^2 R_O j_1 - \lambda_1 \lambda_2 R_O j_2 - \lambda_1 \lambda_3 R_O j_3 = 0;$$

$$e_2 - r_2 j_2 - \lambda_2^2 R_O j_2 - \lambda_2 \lambda_1 R_O j_1 - \lambda_2 \lambda_3 R_O j_3 = 0;$$

$$e_3 - r_3 j_3 - \lambda_3^2 R_O j_3 - \lambda_3 \lambda_1 R_O j_1 - \lambda_3 \lambda_2 R_O j_2 = 0$$

Values of e, j, r and $R_O$ can be known and/or modeled. Accordingly, for purposes of simplification, the following can be defined:

$$a = [R_O j_1 \ R_O j_2 \ R_O j_3]$$

$$b = [e_1 - r_1 j_1 \ e_2 - r_2 j_2 \ e_3 - r_3 j_3]$$

$$C = V_{Oref} \text{ (desired reference voltage)}$$

$$x = \lambda.$$

Therefore, $$b_1 = (a_1 x_1 + a_2 x_2 + a_3 x_3) x_1;$$

$$b_2 = (a_1 x_1 + a_2 x_2 + a_3 x_3) x_2;$$

$$b_3 = (a_1 x_1 + a_2 x_2 + a_3 x_3) x_3;$$

$$C = (a_1 x_1 + a_2 x_2 + a_3 x_3); \text{ and}$$

$$b_i = C x_i \text{ is the desired relationship.}$$

$b_1$, $b_2$, and $b_3$ can be summed, and the following can be ascertained:

$$c - a_i x_i = \sum_{j \neq i} a_j x_j$$

An optimization, utilizing any suitable technique, can be quickly computed to identify appropriate values for $\lambda$ for the three boost converters.

Using the definitions set forth above, the general problem to be optimized for N boost converters is as follows:

$$0 = \Sigma_i [a_i x_i^2 + x_i \Sigma_{j \neq i} a_j x_j - b_i], \quad (22)$$

where $\Sigma a_i x_i = C$, $0 < x_i < 1$, and a, b, C>0.

Figure 6:
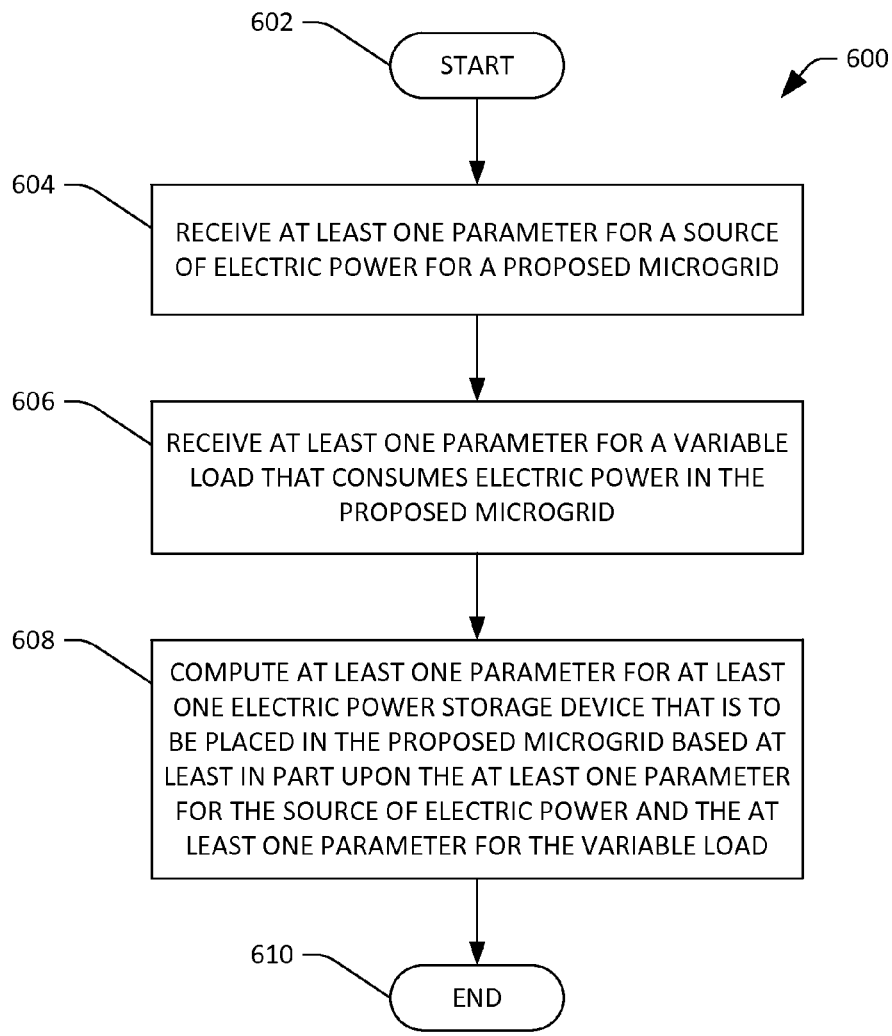
FIG. 6 is a flow diagram that illustrates an exemplary methodology for outputting data that is indicative of at least one parameter of at least one electric power storage device that is to be included in a microgrid.

With reference now to FIG. 6, an exemplary methodology 600 that facilitates computing at least one parameter for at least one electric power storage device that is to be placed in a proposed microgrid is illustrated and described. While the methodology 600 is described as being a series of acts that are performed in a sequence, it is to be understood that the methodology 600 is not limited by the order of the sequence. For instance, some acts may occur in a different order than what is described herein. In addition, an act may occur concurrently with another act. Furthermore, in some instances, not all acts may be required to implement the methodology 600 described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

The methodology 600 starts at 602, and at 604 at least one parameter for a source of electric power for a proposed microgrid is received. At 606, at least one parameter for a variable load that consumes electric power in the proposed microgrid is received. Pursuant to an example, the at least one parameter for the source of electric power received at 604 and the at least one parameter for the variable load received at 606 can be received in a computer-readable model of the proposed microgrid, wherein the computer-readable model of the proposed microgrid comprises a representation of a DC bus. In such an exemplary embodiment, electric power generated by the source of electric power is directed to the DC bus, and electric power consumed by the variable load is retrieved from the DC bus. Pursuant to another example, as described above, the at least one parameter for the source of electric power and the at least one parameter for the variable load that consumes electric power can be received based upon a selection of one or more selectable entities by a designer of the proposed microgrid from a library of entities.

At 608, responsive to receiving the at least one parameter for the source of electric power and the at least one parameter for the variable load, at least one parameter for at least one electric power storage device that is to be placed in a proposed microgrid is computed. The electric power storage device is configured to retain electric power generated by the source of electric power and discharge electric power requested by the variable load. Moreover, the at least one parameter for the at least one electric power storage device is computed based at least in part upon the at least one parameter for the source of electric power and the at least one parameter for the variable load received at 604 and 606, respectively. Still further, the at least one parameter for the at least one electric power storage device computed at 608 conforms to a stability constraint for the microgrid (the static stability constraint or the dynamic stability constraint). The methodology 600 completes at 610.

Figure 7A:
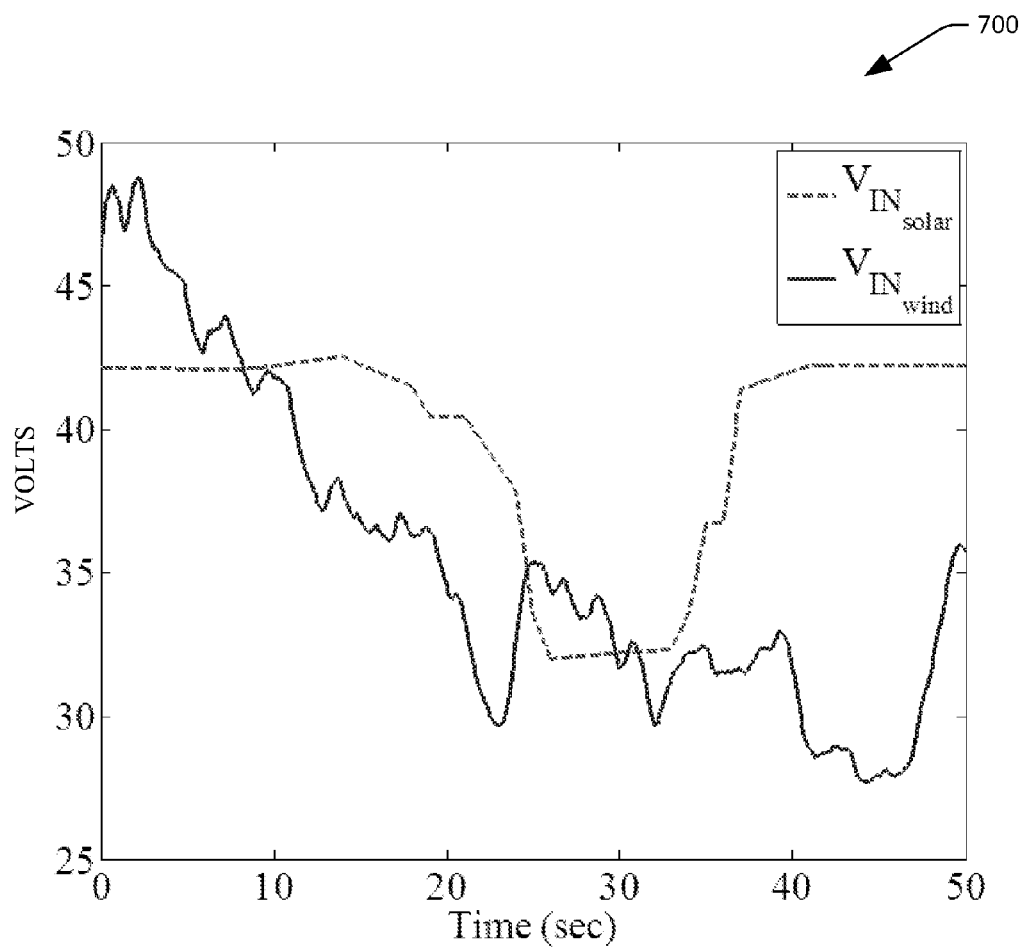
FIGS. 7A-7K are graphs illustrating various parameters of a microgrid.
Figure 7B:
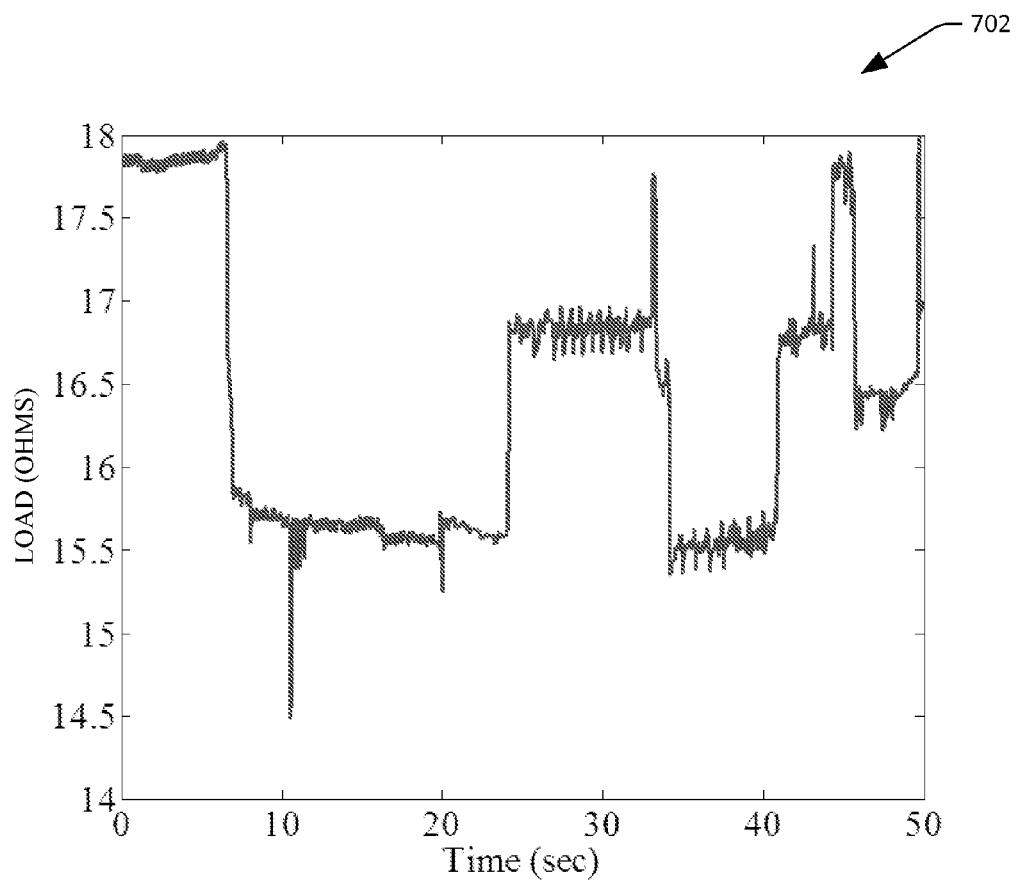
Figure 7C:
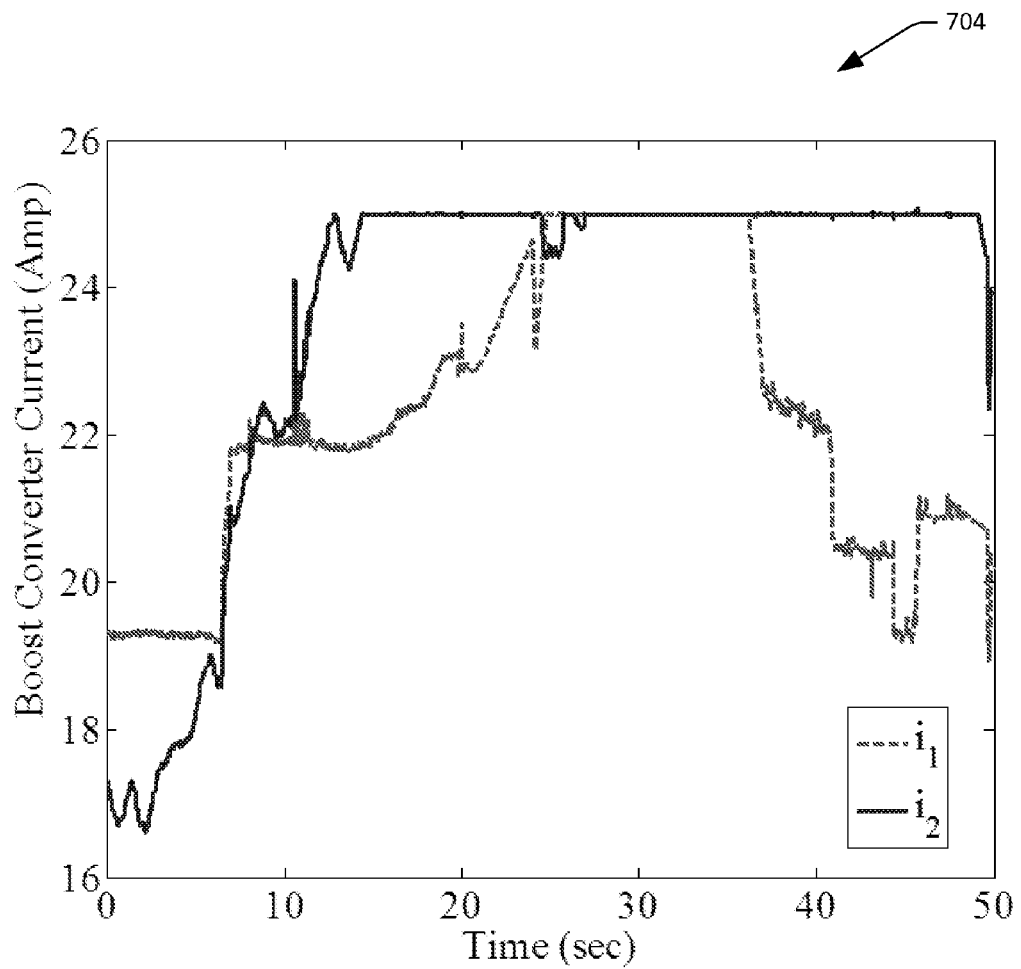
Figure 7D:
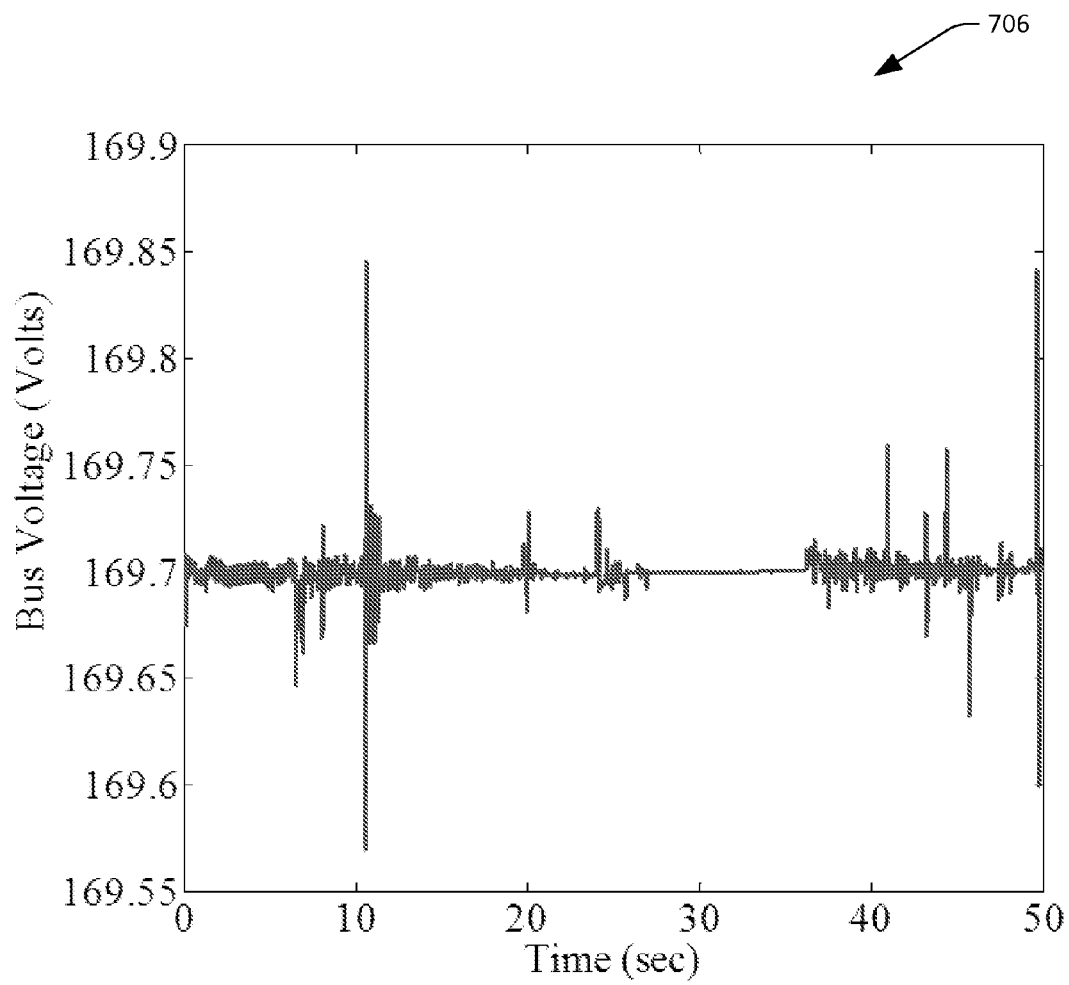
Figure 7E:
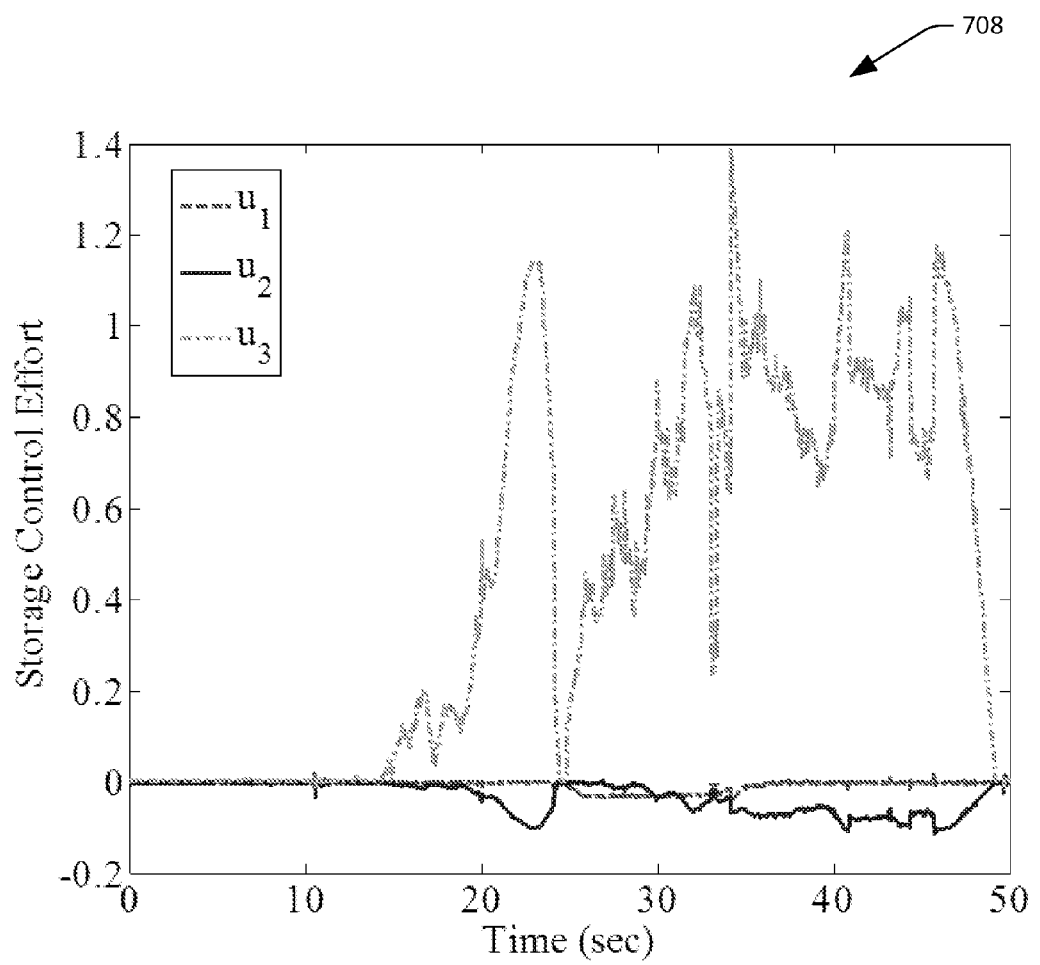
Figure 7F:
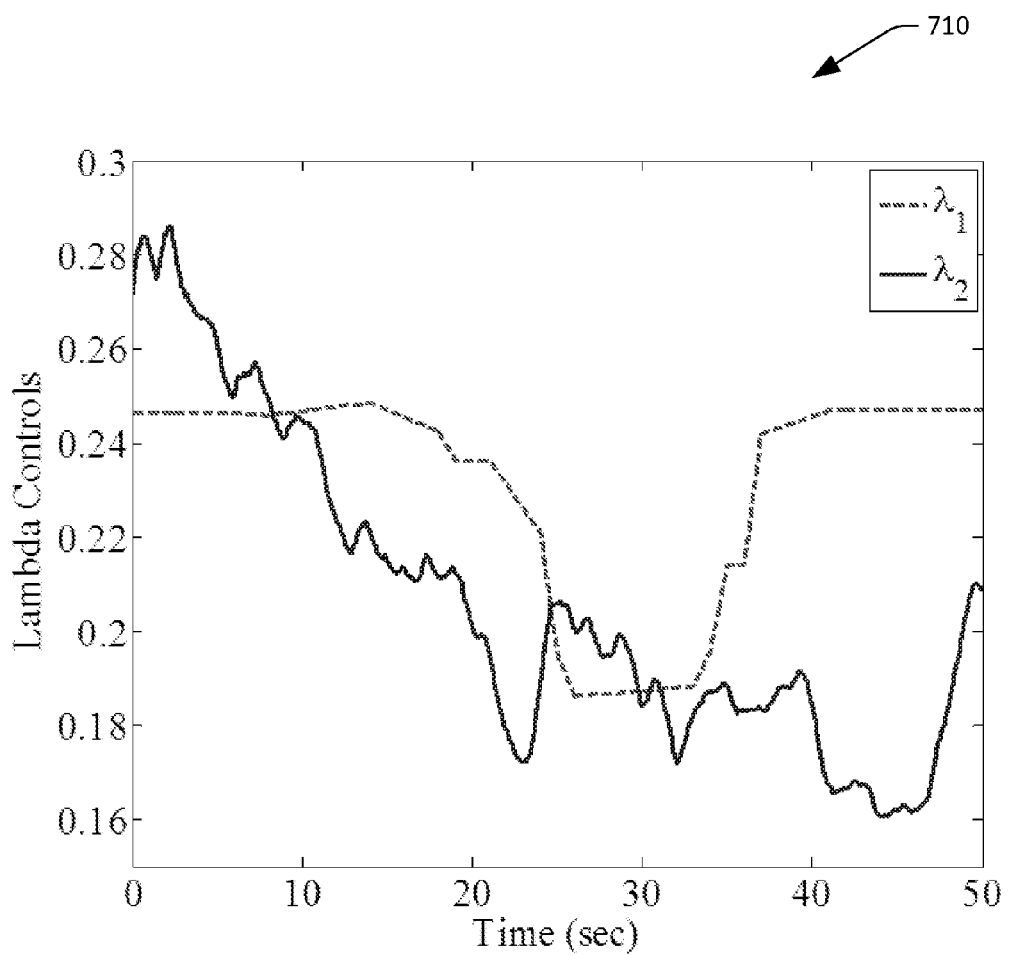
Figure 7G:
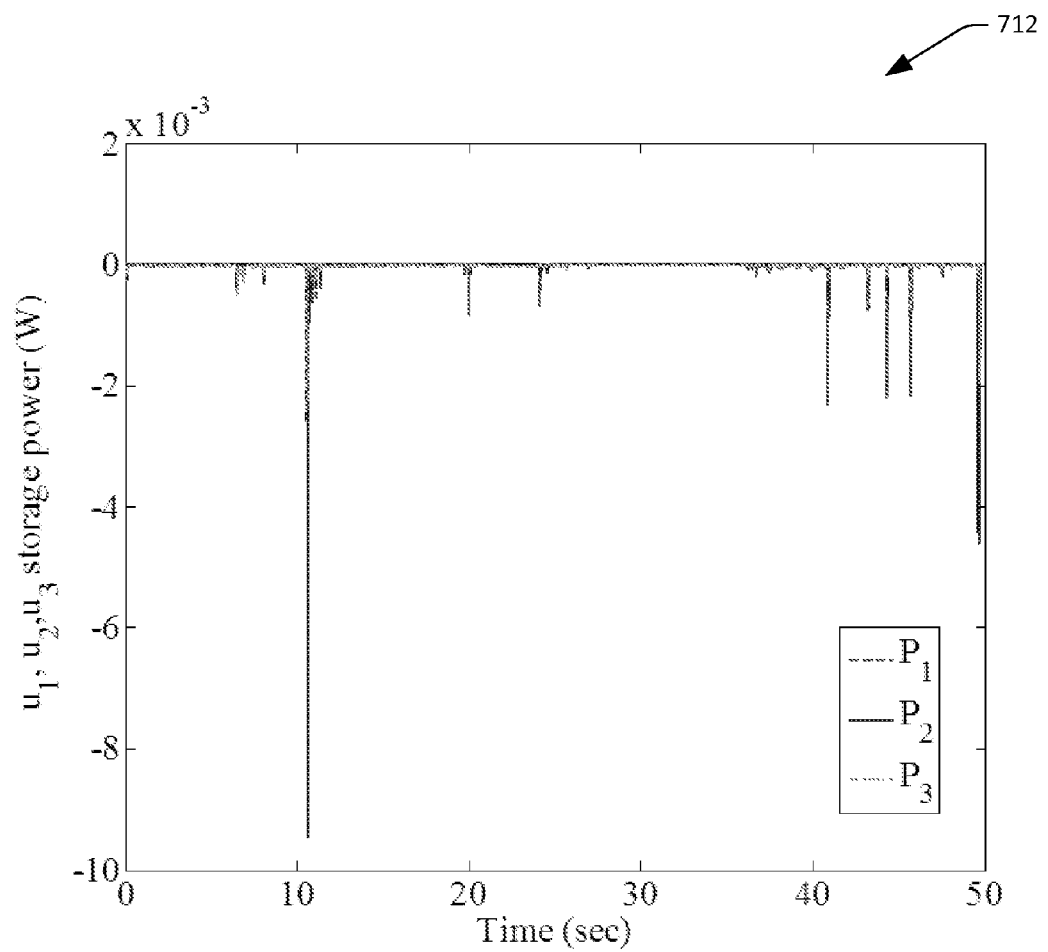
Figure 7H:
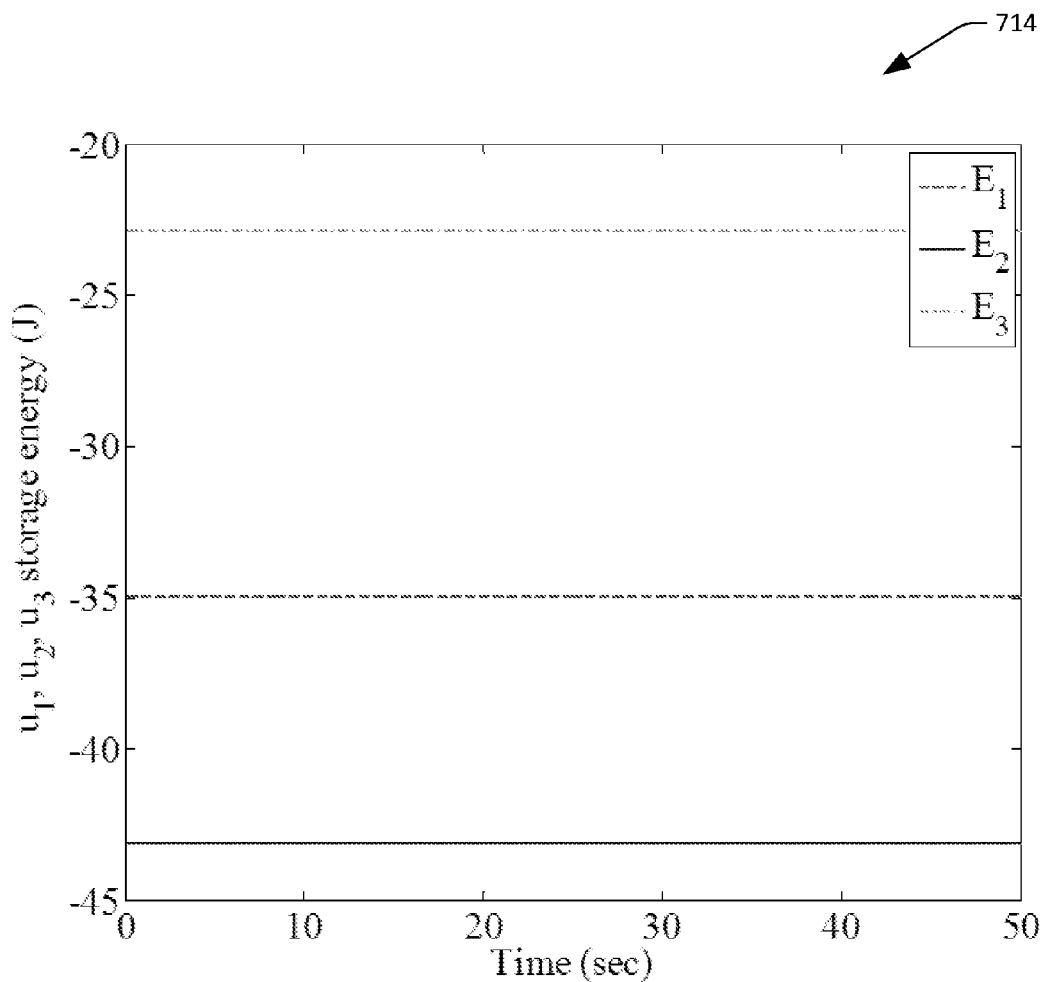
Figure 7I:
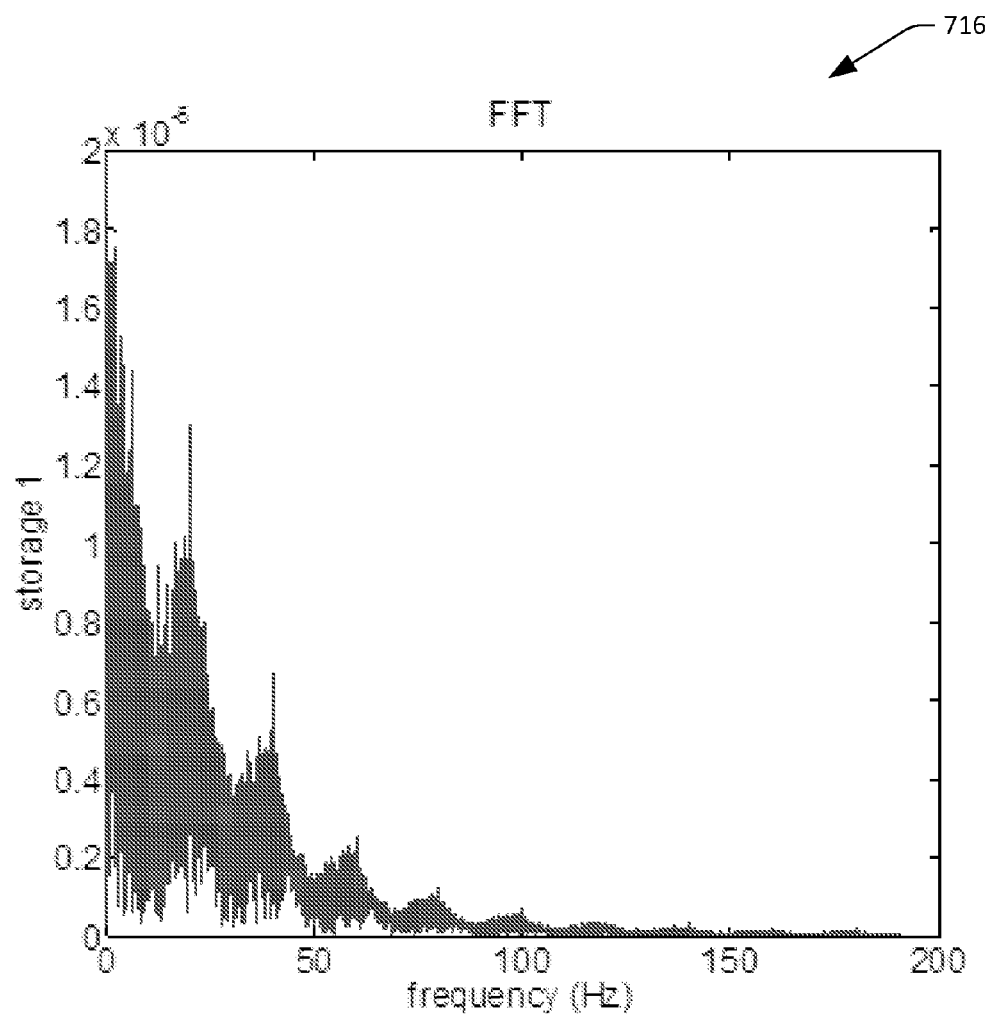
Figure 7J:
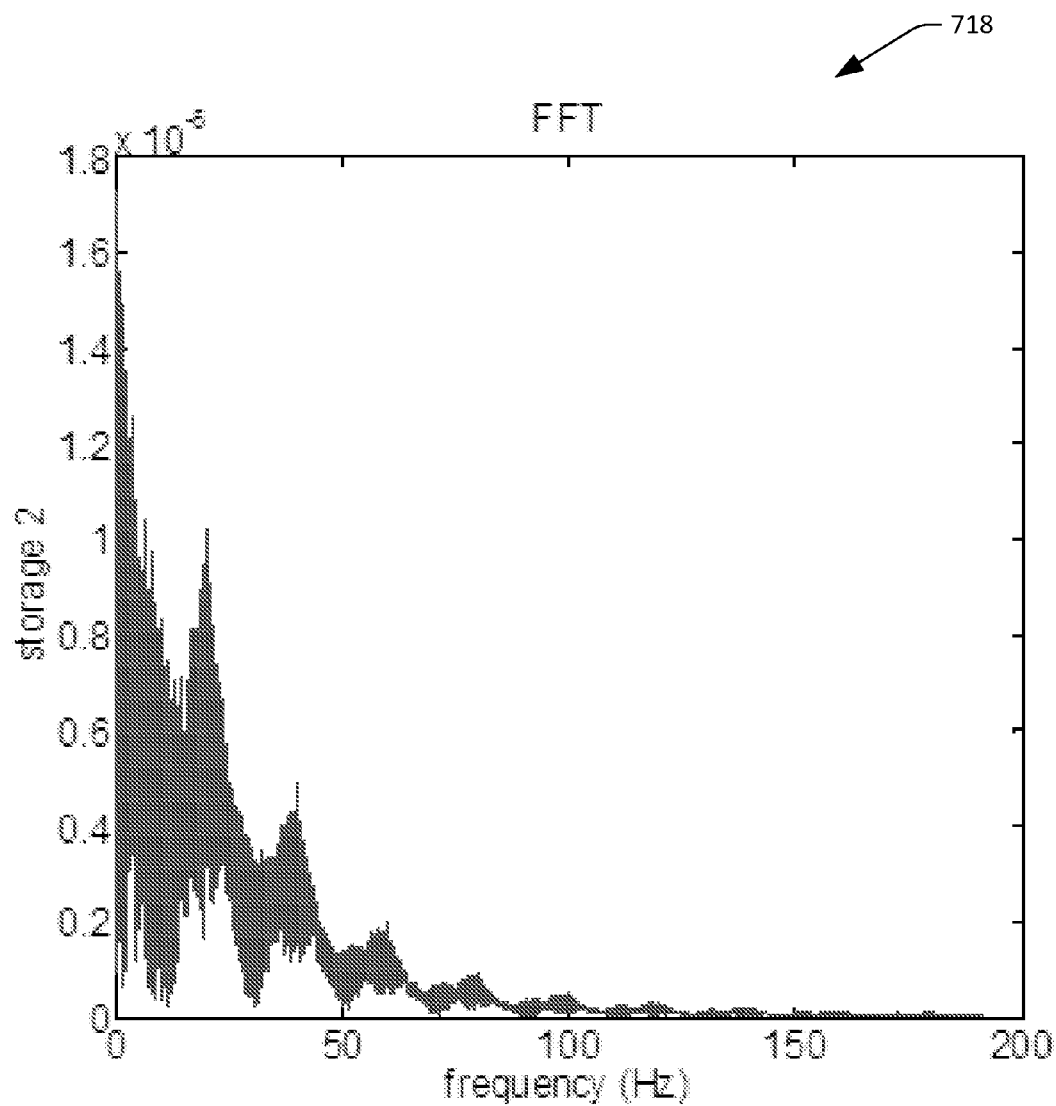
Figure 7K:
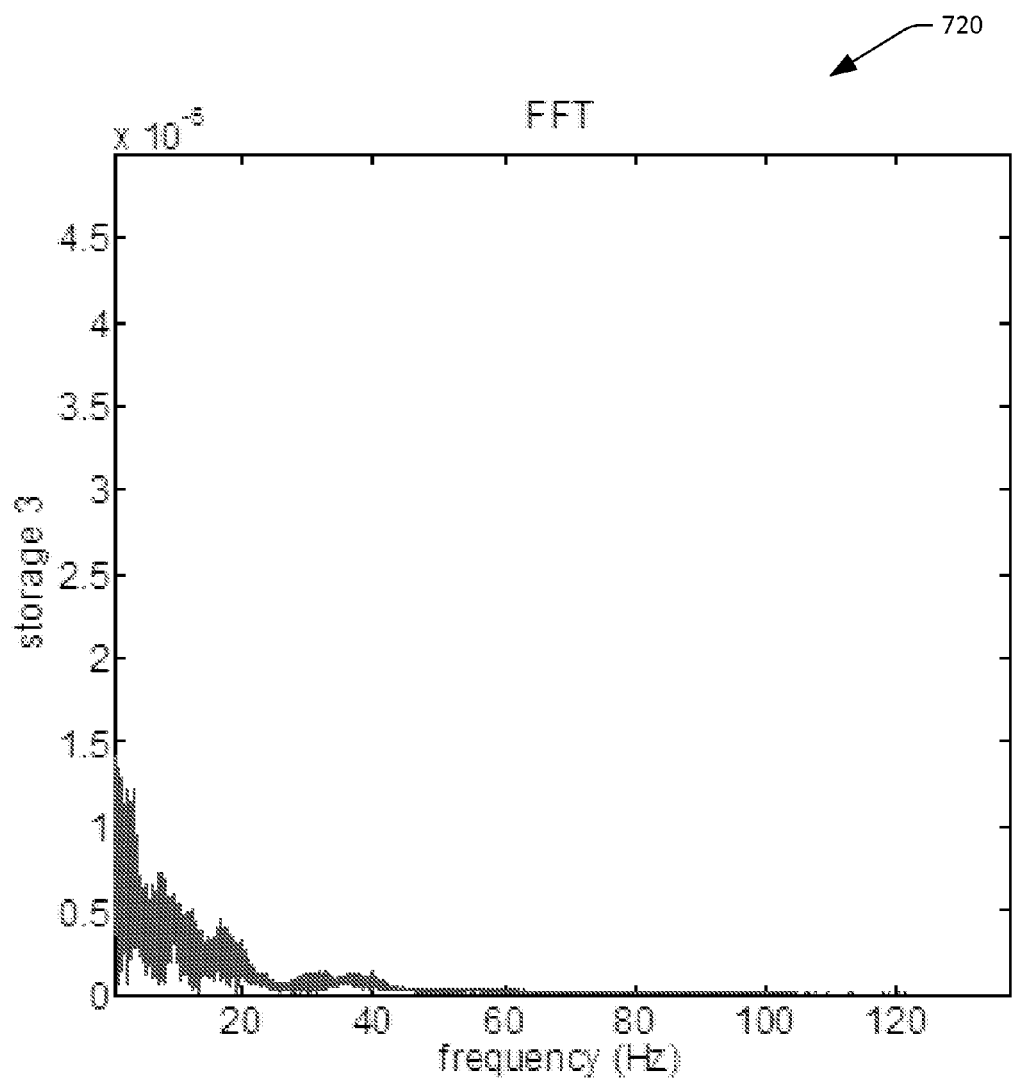

Turning now to FIGS. 7A-7K, simulations pertaining to storage requirements for a microgrid that comprises two variable voltage sources and three electric power storage devices is illustrated. Specifically, FIG. 7A includes a graph 700 that illustrates a sequence of random voltage inputs from two voltage sources (wind and solar sources), and FIG. 7B comprises a graph 702 that illustrates an exemplary variable load. FIG. 7C depicts a graph 704 that illustrates currents in two boost converters in the proposed microgrid (for the two voltage sources), and FIG. 7D depicts a graph 706 that illustrates voltage in the DC bus of the proposed microgrid. In the exemplary graphs, bus voltage has been regulated to be within +/−5% of $V_{B_{reference}}=120\sqrt{2}$, which the response is configured to maintain. FIG. 7E comprises a graph 708, which illustrates energy control storage efforts for the three electric power storage devices, respectively, which correspond to the sequence of voltage inputs shown in the graph 700 and the boost converter current and bus voltage responses described above. FIG. 7F includes a graph 710 that illustrates corresponding λ control inputs for the two boost converters. Referring to FIGS. 7G-7H, from the HSSPFC design, and based upon the data shown in the graphs 700-710, power and energy requirements for the electronic power storages are derived and shown in graphs 712-714, respectively. FIGS. 7I-7K illustrate, via graphs 716-720, exemplary frequency response requirements for the boost controller storage devices and the bus storage device, respectively. Such requirements, as described above, can be used to design and size appropriate energy storage devices to meet needs of a microgrid application.

Figure 8:
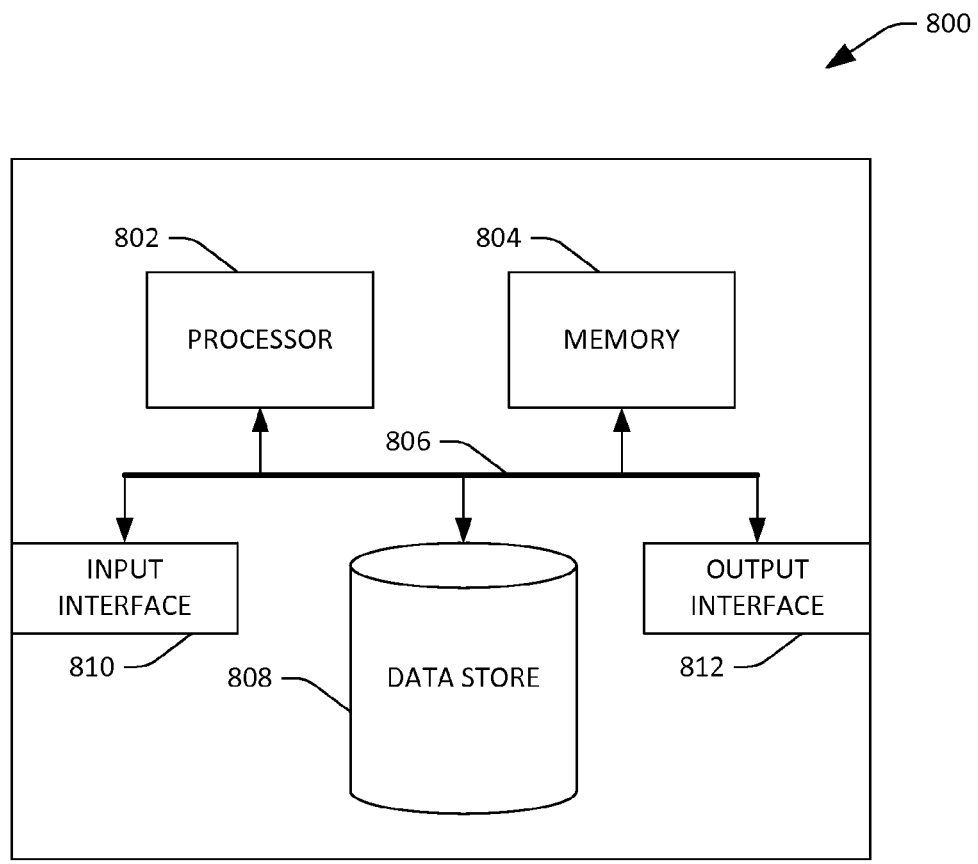
FIG. 8 is an exemplary computing device.

Now referring to FIG. 8, a high-level illustration of an exemplary computing device 800 that can be used in accordance with the system and methodology disclosed herein is illustrated. For instance, the computing device 800 may be used in a system that supports computing at least on parameter of an electric power storage device that is to be included in a microgrid. In another example, at least a portion of the computing device 800 may be included in power electronics with customized parameters. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing the method described above. The processor 802 may access the memory 804 by way of a system bus 806. In addition to storing executable instructions, the memory 804 may also store models of microgrids, parameters of modules of microgrids, etc.

The computing device 800 additionally includes a data store 808 that is accessible by the processor 802 by way of the system bus 806. The data store may be or include any suitable computer-readable storage, including a hard disk, memory, etc. The data store 808 may include executable instructions, models of microgrids, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a portion of a distributed system. Thus, for instance, several devices may be in communication by way of a network connection and may collectively perform tasks described as being performed by the computing device 800.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising: receiving at least one parameter for a source of electric power into a computer-readable model of a proposed microgrid;
   receiving at least one parameter for a variable load that consumes electric power into the computer-readable model of the proposed microgrid;
   responsive to receiving the at least one parameter for the source of electric power and the at least one parameter for the variable load, the computer-readable model computing at least one parameter for at least one electric power storage device having a customized profile that is to be placed in the proposed microgrid, the electric power storage device configured to retain electric power generated by the source of electric power and discharge electric power requested by the variable load, the at least one parameter for the at least one electric power storage device computed based at least in part upon the at least one parameter for the source of electric power and the at least one parameter for the variable load, and wherein the at least one parameter for the at least one electric power storage device conforms to a stability constraint for the microgrid;

wherein the at least one parameter of the at least one electric power storage device is one of electric power storage capacity, charge rate, or discharge rate; and wherein the customized profile conforms to one or more stability constraints; and dynamically controlling and installing an electric power storage device with the customized profile comprising the at least one parameter of the electric power storage device into an operating microgrid;

wherein the customized profile is indicative of the at least one parameter of the electric power storage device that is to be included in the microgrid that satisfies the stability constraint.

2. The method of claim 1, wherein the at least one parameter for the source of electric power and the at least one parameter for the variable load are received in the computer-readable model of the proposed microgrid, the computer-readable model of the proposed microgrid comprising a representation of a direct current bus, wherein electric power generated by the source of electric power is directed to the direct current bus, and wherein electric power consumed by the variable load is retrieved from the direct current bus.

3. The method of claim 1, wherein the source of electric power is a variable source of electric power.

4. The method of claim 3, wherein the variable source of electric power is at least one of a photovoltaic power system, a wind turbine, a geothermal power system, a solar power tower, or a hydro pump.

5. The method of claim 1, wherein the proposed microgrid is modeled as a plurality of boost converters that are fed by respective voltage sources, and further comprising computing duty cycles for the plurality of boost converters such that the proposed microgrid is stable.

6. The method of claim 1, further comprising computing control parameters for controlling power electronics in the proposed microgrid, wherein the control parameters facilitate control of flow of electric power into and out of the electric power storage device, wherein the control parameters comprise at least one duty cycle command for a boost converter in the proposed microgrid.

7. The method of claim 1, wherein the at least one parameter for the at least one electric power storage device indicates that the at least one electric power storage device is desirably a rechargeable battery or a capacitor bank.

8. The method of claim 1, wherein the at least one parameter for the at least one electric power storage device indicates that the at least one electric power storage device is desirably a flywheel.

9. The method of claim 1, further comprising:

providing a library of selectable entities, wherein selection of an entity in the library of selectable entities causes the entity to be placed in the proposed microgrid;

receiving a selection of the electric power source from the library of selectable entities; and receiving a selection of the variable load from the library of selectable entities.

10. A system, comprising:

a receiver component that receives an indication that a customized profile for an electric power storage device that is to be included in a proposed microgrid is desirably generated, wherein the proposed microgrid comprises:

an electric power source that generates electric power;

a variable load that consumes electric power;

the electric power storage device, wherein the electric power storage device is configured to supplement the source of electric power when demand of the variable load exceeds supply of electric power produced by the source of electric power, wherein the electric power storage device is configured to supplement the variable load when supply of electric power produced by the source of electric power exceeds demand of the variable load, wherein the source of electric power has parameters that are descriptive thereof, and wherein the variable load has parameters that are descriptive thereof; and a profile calculator component that, responsive to the receiver component receiving the indication, uses a microgrid model to generate the customized profile for the electric power storage device based at least in part upon the parameters that are descriptive of the source of electric power and the parameters that are descriptive of the variable load;

wherein the customized profile conforms to one or more stability constraints; and wherein the customized profile is implemented in the at least one electric power storage device in a collective microgrid represented by the microgrid model; and dynamically controlling the electric power storage device with the customized profile within the one or more stability constraints.

11. The system of claim 10, wherein the source of electric power is a variable source of electric power.

12. The system of claim 11, wherein the source of electric power is one of a photovoltaic power system, a wind turbine, a geothermal power system, a solar power tower, or a hydro pump.

13. The system of claim 10, wherein the microgrid comprises a direct current bus, wherein the electric power storage device emits electric power to the direct current bus, and wherein the variable load consumes power from the direct current bus.

14. The system of claim 10, wherein the customized profile for the storage device conforms to a collection of batteries.

15. The system of claim 10, wherein the customized profile for the storage device conforms to a flywheel.

16. The system of claim 10, wherein the customized profile for the storage device conforms to a capacitor bank.

* * * * *